Sept. 17, 1929.   D. W. SMITH   1,728,702
PIE TRIMMER
Filed June 18, 1927   3 Sheets-Sheet 1

Inventor
Dennis W. Smith

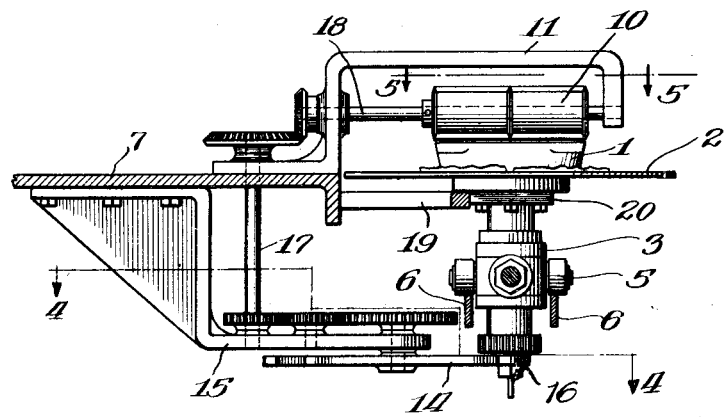
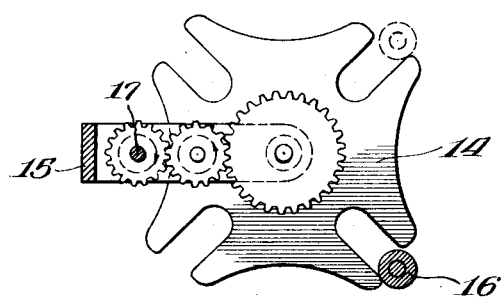
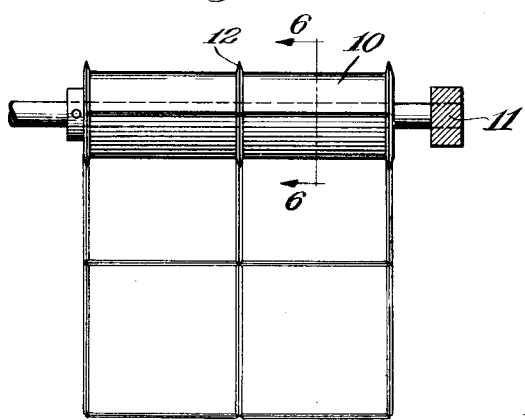
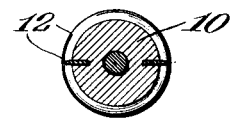

Sept. 17, 1929.     D. W. SMITH     1,728,702

PIE TRIMMER

Filed June 18, 1927     3 Sheets-Sheet 3

Inventor
Dennis W. Smith
By Rummler & Rummler
Attys.

Patented Sept. 17, 1929

1,728,702

UNITED STATES PATENT OFFICE

DENNIS W. SMITH, OF WILMETTE, ILLINOIS, ASSIGNOR TO COLBORNE MANUFACTURING COMPANY, OF CHICAGO, ILLINOIS, A CORPORATION OF ILLINOIS

PIE TRIMMER

Application filed June 18, 1927. Serial No. 199,742.

This invention relates to improvements in pie making machines, and more particularly to improvements in the means for trimming the pies.

Heretofore the pies have been trimmed by rollers mounted on revolving heads, which were rotated in a plane parallel to the surface of the pie. The revolving member was usually carried on a support, which was reciprocated to move along with each pie support in succession, while the head was rotated to swing the rollers around the periphery of the pie. Then for trimming square pies, the pie was passed under a pair of stationary rollers, and then rotated ninety degrees and passed under a second pair of rollers to cut the edges which were at right angles to the edges cut by the first rollers. The former method was only adapted for trimming a single pie on each support; and the latter method was only adapted for square shaped pies, although it was used for trimming pies which were made in groups on each support.

In such methods, considerable motion was necessary for various parts of the mechanism, which, of course, necessitated retarding the operation of the machine as a whole to give sufficient time for the trimming.

In the present invention, the pies are trimmed at one pass beneath the trimmer, which merely rolls over the surface of the pie. The trimming member is provided with severing means which conform to the complete outline of the pie, and which cooperate with the upper edges of the support to trim the pie on all sides. Obviously, with such trimming means, the pies may be of any desirable shape, such as round or square, and a plurality of pies may be trimmed simultaneously on each support, as easily as a single pie.

In making pies, the pie crust must be sealed together at the edges to prevent the juices from running over the edges of the tins during the baking; and the dough must be cleanly severed without sticking to the trimming members. Therefore, in this invention, beveled edged cutters are used, which cut along a line and press the crusts firmly together at either side of the cut. At the portions of the cuts which are substantially parallel to the direction of the motion of the pie, the cutters roll into and out of the crusts without much danger of sticking; and, at the transverse cuts, the edges enter and leave at opposite angles. This angular motion enables the cutters to free themselves from the dough without sticking and lifting the edge of the crust, which would of course spoil the pie for baking. Therefore, with this invention, if the crusts are properly moistened the pies may be rapidly trimmed, the machine operated at a higher rate, the danger of troublesome sticking is obviated, and round or square pies may be handled.

Among the main objects of the invention are to provide a simple pie trimmer which is adaptable for trimming pies of any shape, and is especially adaptable for trimming groups of pies which have been simultaneously formed with the crusts all in one piece.

An illustrative embodiment of this invention is shown in the accompanying drawings, in which:

Fig. 3 is a section taken on the line 3—3 of Fig. 1.

Fig. 4 is a detail section taken on the line 4—4 of Fig. 3.

Fig. 5 is a plan view of the roller, showing the pattern of the cut.

Fig. 6 is a cross section of the roller, taken on the line 6—6 of Fig. 5.

Figure 1:
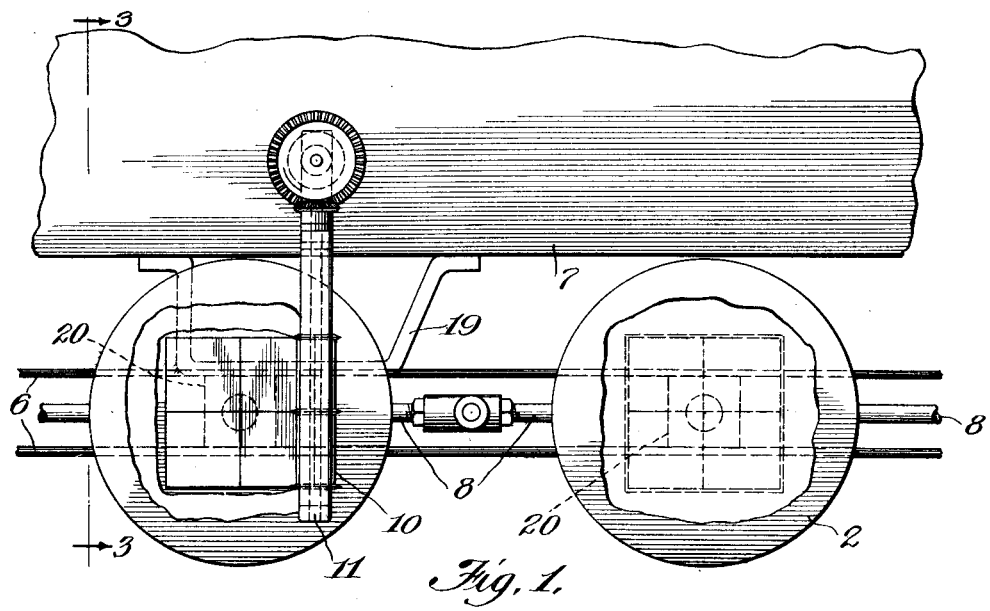
Fig. 1 is a plan view of the trimmer portion of the pie machine.
Figure 2:
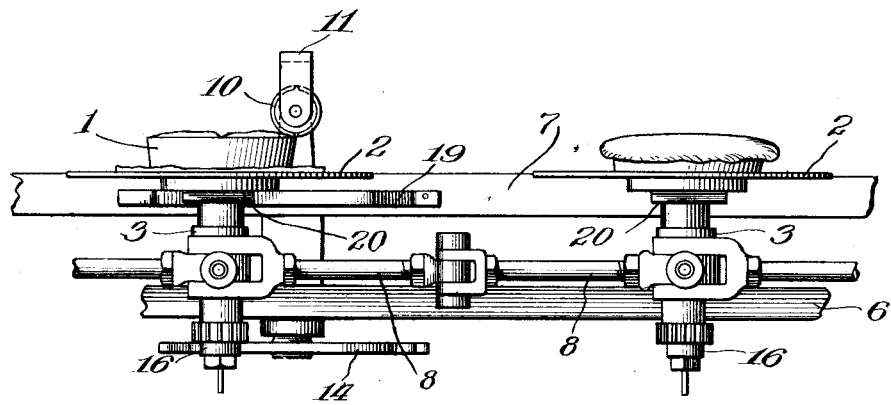
Fig. 2 is a side elevation of Fig. 1.

Referring to the drawings, supports for carrying the pies consist of the holders 1 which are mounted on the horizontal disks 2, which are revolubly mounted in the bearing members 3. The bearing members are supported by rollers 5, which ride on the rails 6, the rails 6 being supported at the side of the main frame 7 of the machine. The bearing members 3 are connected by the jointed links 8 into a flexible train, or conveyor belt, which is continuously driven.

The pie tins are inserted in the holders with the flanges projecting over the upper edges of the holders; and the pies are formed in the tins by laying the crusts over the holders, the filling being inserted before the top crust is laid in place. As the pies approach the trimming means, moving to the left as viewed in Fig. 1, the pie is completely formed with the edges of the crusts hanging over the sides of the holder.

As shown in the drawings, the trimming member of this invention consists of a roller 10, which is rotatably mounted in the bracket 11, which is secured to the frame 7, the roller being positioned to project over the path of the pie supports.

Severing means 12 are provided on the surface of the roller, which cooperate with the edges of the holder on the support, and are arranged to conform to the outlines of the pies, which in the particular illustration, is in the shape of four adjoining squares.

Preferably driving means are provided for rotating the roller which are connected to each holder in succession, as the holders pass by the trimming means. As shown, this means consists of the plate 14, which is rotatably mounted on the bracket 15, which depends from the frame 7. The plate 14 is provided with four radial slots in which the rollers 16, on the lower portion of the bearing members 3, engage in succession, so as to rotate the plate exactly ninety degrees. The plate 14 is geared to the vertical shaft 17, which, at the upper end, is geared to the shaft 18 of the roller 10.

For alining the pies with the trimming member, a rail 19 is secured to the frame 7 and projects to engage with the sides of the square cam 20, which is carried on the upper end of each bearing member 3. Thus it will be seen that, as the pie supports approach the trimmer, the cam 20 engages with the guide member 19, and is thereby rotated into a position with the flat side of the cam sliding on the edge of the guide rail 19. This alines the holders with the trimming roller 10, which is then rotated by the driving means described above, to roll over the surface of the pie as the pie is passed underneath the roller. The crusts are completely severed at the sides and the pies divided at one operation, which may be performed quite rapidly.

Figure 7:
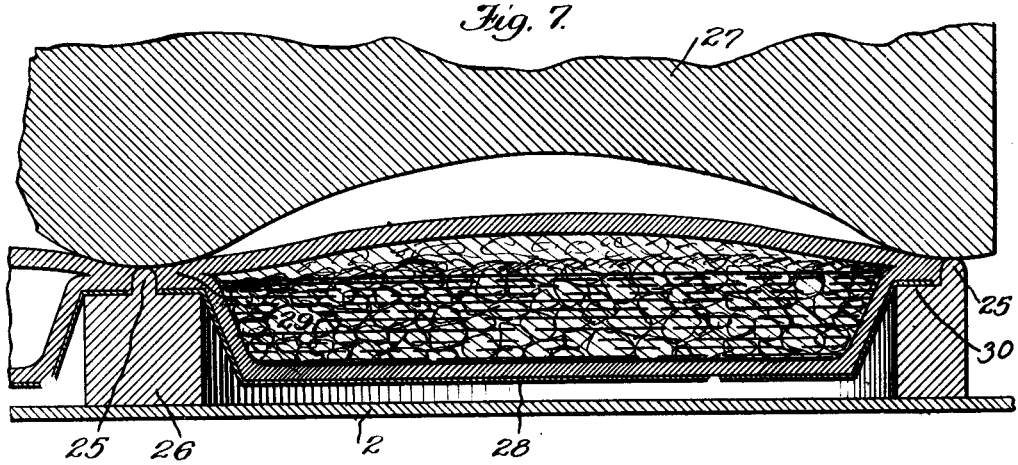
Fig. 7 is a cross section illustrating a modified form of trimming roller for trimming four round pies.
Figure 8:
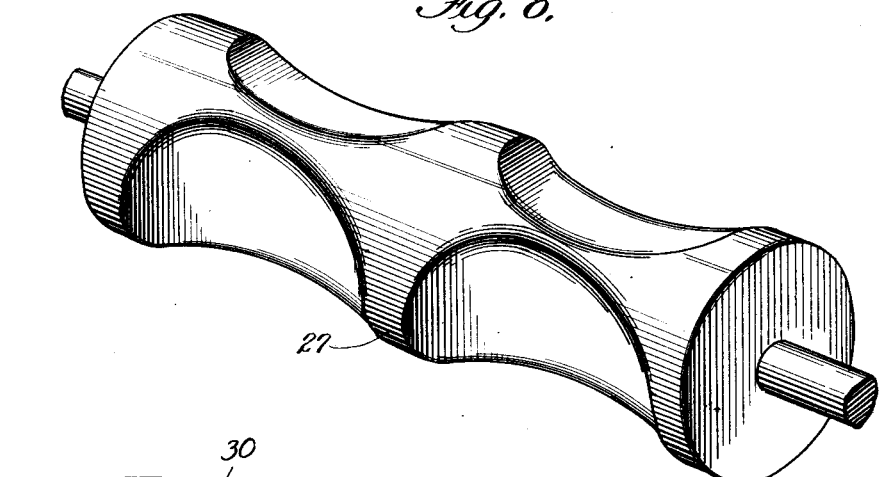
Fig. 8 is a perspective view of the trimming roller shown in partial section in Fig. 7.
Figure 9:
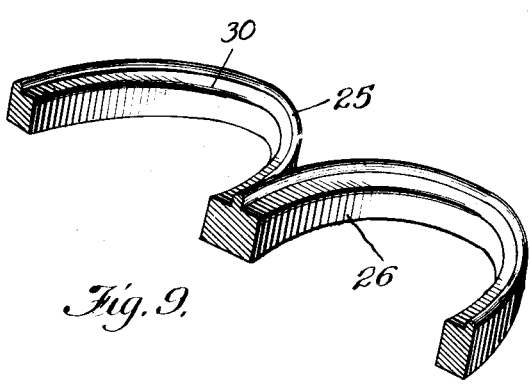
Fig. 9 is a fragmental perspective view of the holder.

In the form of trimmer shown in Fig. 7 and Fig. 8, the ridges 25, for severing the crust, are incorporated on the holder 26; and the trimming roller 27 merely contacts with these ridges so as to crush the dough together and sever it. The holder 26 is mounted on the disk 2, as in the form previously described. The pie tins 28 are inserted in conforming recesses in the holder 26, with the flanges or rims 29 of the pie tins resting on annular shoulders 30, which are provided in the upper surface of the holder. The surfaces of the trimming roller which bear against the ridges 25 are rounded on a large radius so that the edges of the crusts at the sides of the ridges are tightly squeezed together, as is shown in Fig. 7. The portions of the roller over the center of the pies are hollowed out so that they will not contact with the upper surface of the crust. Obviously, provided that the trimming roller is in proper timing relation with the pie holder, the pies can be trimmed nearly as fast as they can be fed under the roller.

Although but one specific embodiment of this invention has been herein shown and described, it will be understood that numerous details of the construction shown may be altered or omitted without departing from the spirit of this invention as defined by the following claims:

I claim:

1. In combination, in a pie machine, a pie support, a trimming roller journalled on an axis parallel to the support, means for causing relative movement between the support and the trimming roller, and means for operatively connecting the support and roller for rotating the roller when the support is in a predetermined position so that it rolls over the surface of the pie during said movement, the surface of the trimming roller being recessed in a pattern conforming to the shape of the pie so as to contact with the support at the edges of the pie.

2. In combination in a pie machine, a series of pie supports, a trimming roller rotatably mounted on an axis parallel to the plane of the supports, the surface of the roller being recessed to conform to the outline of the pie carried by the supports, means for passing the supports under the roller, and driving means operatively connected with said roller comprising a cam for engaging each of said supports successively to rotate said roller in a predetermined relation to the pies on said supports, as the supports pass under the roller for registering the recesses of said roller with predetermined portions of said pies.

3. In combination in a pie machine, a plurality of movable pie supports, a rotatably mounted trimming roller extending across the path of the supports, the roller being adapted to contact with the support in a pattern conforming to the outline of the pie carried on the support, and means comprising a cam connected to the roller for successively engaging the supports for positively rotating the roller for registering the pattern thereon with the outline of the pie as the support passes underneath the roller.

4. In combination in a pie machine, a movable train of pie supports, a rotatably mounted trimming roller extending across the path of the supports, the roller being adapted to contact with each support in a pattern conforming to the outline of the pies carried on the supports, and means connecting the roller to each support in succession for positively rotating the roller to register the pattern thereon with the outline of the pie as the supports pass underneath the roller.

5. In combination in a pie machine, a movable train of pie supports, a roller extending transversely across the path of the supports, ridges on the surface of the roller conforming to the complete outlines of the pies carried by the supports, and means for rotating the roller in cooperative relation with each support to completely trim the pies.

6. In combination in a pie machine, movable train of pie supports, a roller extending across the path of the supports and means for operatively connecting said roller and supports in succession when the pies thereon are in registration with said roller to positively drive the roller through a complete revolution for engaging corresponding surfaces of the pies on the supports with the same surface of the roller.

7. In combination in a pie machine, a frame, substantially horizontal tracks spaced from the side of said frame, movable pie supports mounted on said tracks, a roller mounted on said frame extending across the path of the supports, driving mechanism comprising a cam adapted to be actuated by an extension of the support, and a train of gears operatively connected between the cam and the roller for positively rotating the latter in a fixed relation to the movement of the supports.

Signed at Chicago this 16th day of June, 1927.

DENNIS W. SMITH.